A. P. BRUSH.
LUBRICATING SYSTEM FOR AUTOMOBILE TRANSMISSION MECHANISM.
APPLICATION FILED MAY 8, 1911.

1,055,017.

Patented Mar. 4, 1913.
3 SHEETS—SHEET 1.

A. P. BRUSH.
LUBRICATING SYSTEM FOR AUTOMOBILE TRANSMISSION MECHANISM.
APPLICATION FILED MAY 8, 1911.

1,055,017.

Patented Mar. 4, 1913.

A. P. BRUSH.
LUBRICATING SYSTEM FOR AUTOMOBILE TRANSMISSION MECHANISM.
APPLICATION FILED MAY 8, 1911.

1,055,017.

Patented Mar. 4, 1913.

3 SHEETS—SHEET 3.

UNITED STATES PATENT OFFICE.

ALANSON P. BRUSH, OF FLINT, MICHIGAN.

LUBRICATING SYSTEM FOR AUTOMOBILE TRANSMISSION MECHANISM.

1,055,017. Specification of Letters Patent. Patented Mar. 4, 1913.

Application filed May 8, 1911. Serial No. 625,868.

*To all whom it may concern:*

Be it known that I, ALANSON P. BRUSH, a citizen of the United States, residing at Flint, in the county of Genesee and State of Michigan, have invented a certain new and useful Improvement in Lubricating Systems for Automobile Transmission Mechanism, of which the following is a full, clear, and exact description.

One form of power transmitting mechanism which is in common use on automobiles includes change speed gearing and a multiple disk clutch. The change speed gearing must be well lubricated, but more than enough oil in the gear case does no harm. The multiple disk clutch also requires lubrication, but, if too much oil is in the clutch case, the clutch will become uncertain and inefficient in action.

This invention relates to means for maintaining a substantially constant level of oil in the clutch case, irrespective of the quantity of oil which is in the gear case.

The invention is shown in connection with a unit power plant such as forms the subject matter of my co-pending application Serial No. 625,869, filed May 8, 1911, but, as will be understood from the description and appended claims, it is not at all essential that the invention, broadly defined, shall be a part of this precise mechanism.

Figure 1:
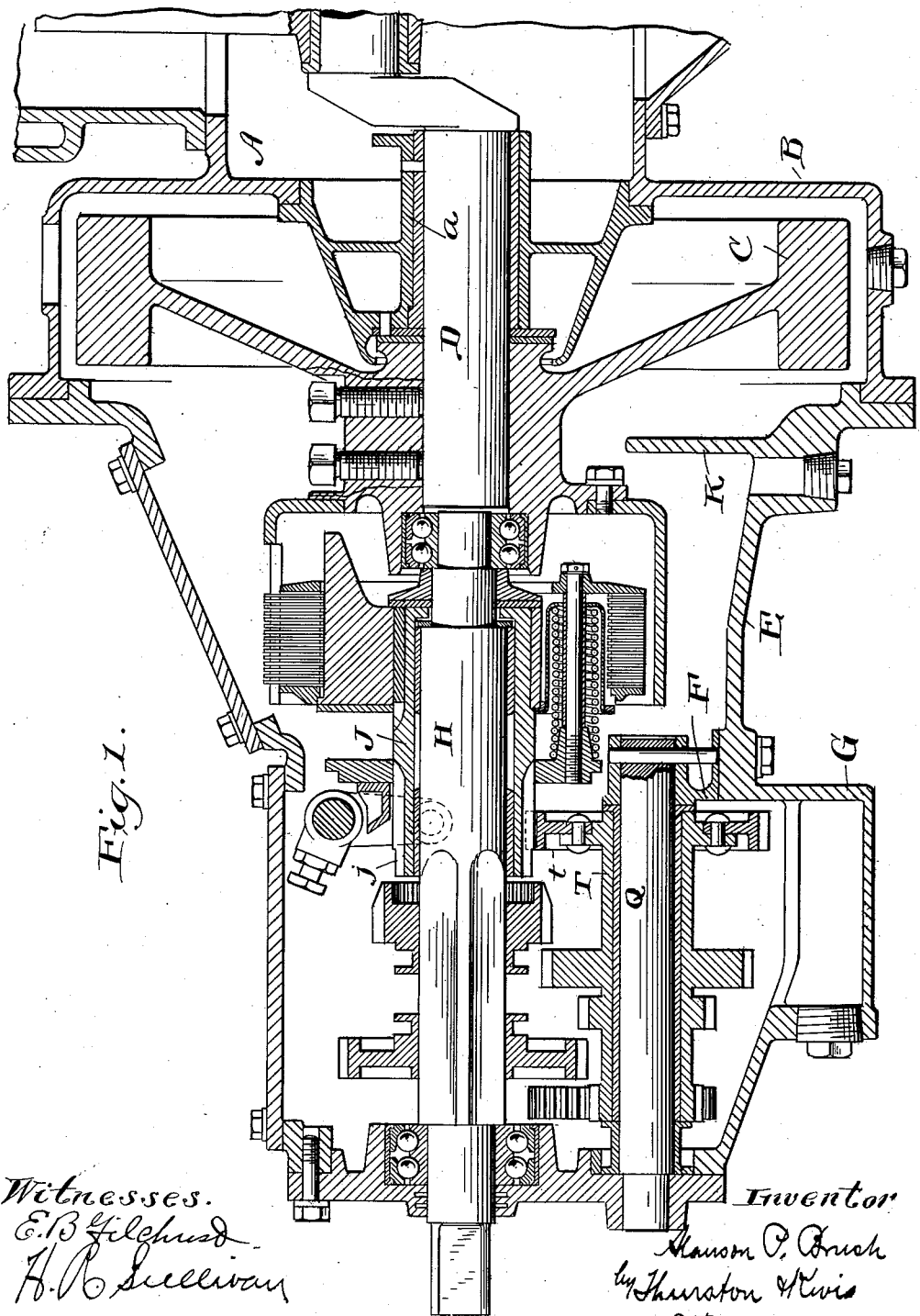
Figure 2:
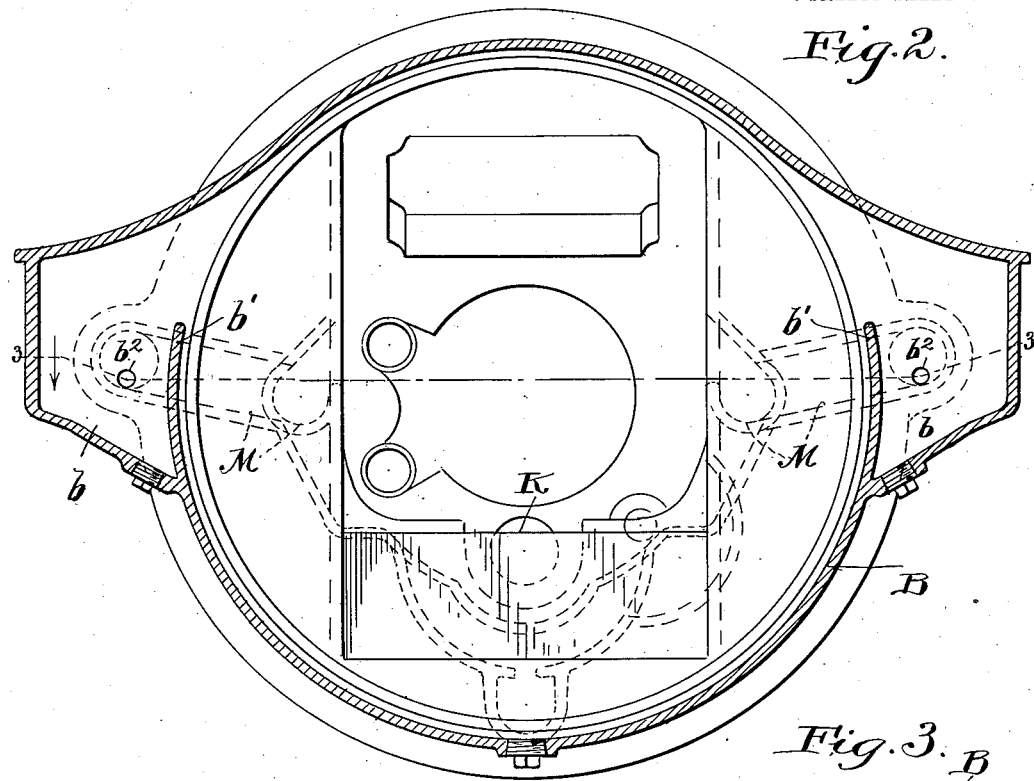
Figure 3:
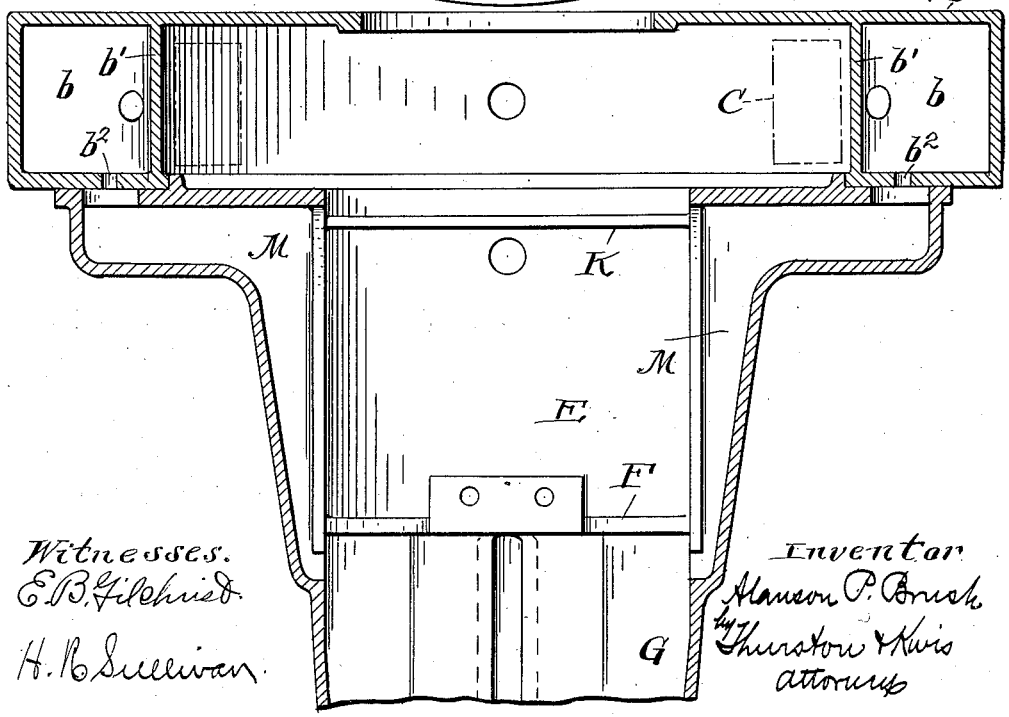
Figure 4:
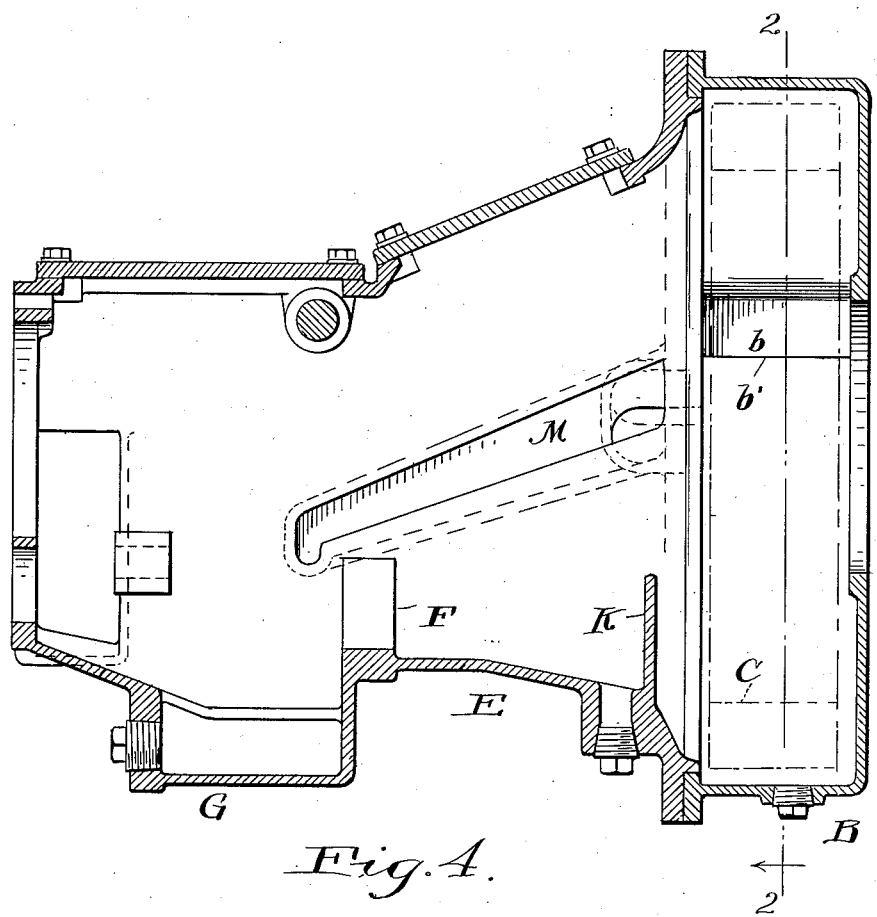

In the drawing, Figure 1 is a vertical longitudinal sectional view through the gear case, the clutch case, the fly wheel housing and the rear part of the crank case. Fig. 2 is a transverse sectional view of the casing in the plane indicated by line 2—2 on Fig. 4. Fig. 3 is a sectional plan view of the casing shown in the plane of line 3—3 on Fig. 2; and Fig. 4 is a central sectional side elevation of said casing.

Referring to the parts by letters, A represents the crank case which may be of any suitable construction. There is formed on the rear part of the crank case, as shown, a housing B for the fly wheel C. This fly wheel is fixed to a part of the crank shaft D which projects rearward beyond the rear crank shaft bearing $a$, which is rigid with the crank case. Behind this fly wheel housing and rigidly fastened to it is the clutch case E, and behind that and rigid with it is the gear case G. As a matter of fact, the clutch case and gear case are made integral with each other, but inside they are separated in a satisfactory degree by the vertical partition F. The only function this partition has, in so far as it relates to the present invention, is to act as a separator between the clutch case and the gear case. It is, however, utilized to support a cylindrical bar Q on which a gear sleeve T rotates, said gear sleeve being a part of the change speed gearing. The clutch mechanism is in that part of the casing in front of this partition which, for convenience, will be termed the clutch case; while the change speed mechanism is in that part of the casing which is behind this partition, and which for convenience will be called the gear case. The specific construction of the change speed gearing is not at all material to this invention, and may be of any ordinary well known form. The driven member of the change speed mechanism in the construction shown is the shaft H, and the driving member is the quill shaft J. This quill shaft has near its rear end gear teeth $j$ which are always in mesh with a gear $t$ on the gear sleeve.

The clutch mechanism is specifically such as is described in detail in my co-pending application referred to, but may be of any suitable and well known form.

For reasons stated, the change speed mechanism and clutch mechanism would seem to require no further description here.

In the front end of the clutch case and rising from the bottom thereof is a partition K, the top edge whereof is in the plane in which it is desired to maintain the oil level in the clutch case. This partition lies between the clutch case and the fly wheel housing, wherefore any excess of oil in the clutch case will flow over this partition into the fly wheel housing. This fly wheel housing has at both sides thereof outwardly extended pockets $b$ communicating with the interior of said housing over a vertical partition $b'$. Extending from these pockets rearward and downward are conduits M, the rear ends of which communicate with the gear case. In the specific construction shown these conduits are troughs formed on the inner surface of the side walls of the casing E—G.

In preparing the described apparatus for use one will put into the gear and clutch cases somewhat more oil than is actually required. Now, when the crank shaft is turned and the clutch is thrown in, the quill shaft will be rotated, and it will rotate the gear sleeve because of the intermeshing of the gears $t$ and $j$. The gear $t$ will dip into the oil in the gear case, wherefore this gear will lift some of the oil. As the two gears interlock the oil will be squeezed from between them. The oil which is squeezed forward will go into the clutch case. When the oil so discharged into the clutch case has risen to the level of the partition K it will flow over this partition into the fly wheel housing where it will accumulate in the bottom so that the fly wheel will dip into it as it rotates. The oil lifted by the fly wheel will be thrown against the walls of the housing and will run down the same into the pockets $b$. When a sufficient quantity has accumulated therein, it will flow through the holes $b^2$ into the conduits M and thence back into the gear case.

It is obvious that if there is an excess of oil in the oil containing system described there will be no excess in the clutch case. It will be somewhere else. So long as there is any oil in this system, this clutch case will contain a uniform quantity so long as there is enough to fill the clutch case up to the top of said partition. But, even if there is only a small quantity of oil in the gear case, the gear $t$ will dip into it and lift it, and part of this oil will be forced forward into the clutch case.

Having described my invention, I claim:

1. In automobile transmission mechanism, the combination of a clutch case, a gear case which is rigidly attached to the clutch case, an upwardly extended partition within said cases and sufficiently separating them, means causing a slow flow of oil from the gear case to the clutch case, a fly wheel housing to which the clutch case is rigidly fixed, a partition separating the clutch case from said housing, pockets in the sides of said housing, downwardly inclined conduits leading from said pockets to said gear case, and a rotatable fly wheel in said housing.

2. In automobile transmission mechanism, the combination of a clutch case, a gear case, a partition sufficiently separating said cases, change speed gearing mounted in the gear case including two intermeshing gears, of which one gear is adapted to dip into oil in said gear case, the pitch line of said gears at the point where they intermesh being above the top of said partition, a fly wheel housing, a partition separating the clutch case from said housing, the top of said partition being in the plane at which it is desired to maintain the oil level in the clutch case, pockets in the side of the housing, and conduits leading from said pockets to said gear case.

3. In an automobile, the combination with the crank case of a fly wheel casing which is rigid with the crank case and projects rearward therefrom, a gear case, and a clutch case which lies between the gear case and fly wheel case and is directly and rigidly connected with both,—there being within this composite casing two partitions, one between the gear case and clutch case and one between the clutch case and fly wheel case, which partitions extend upward from the bottom of the casing members to planes a substantial distance below the engine crank shaft, whereby said partitions prevent the free flow of oil from one casing to another until the oil level in the gear case and clutch case have reached predetermined levels.

In testimony whereof, I hereunto affix my signature in the presence of two witnesses.

ALANSON P. BRUSH.

Witnesses:
E. L. THURSTON,
H. R. SULLIVAN.